UNITED STATES PATENT OFFICE.

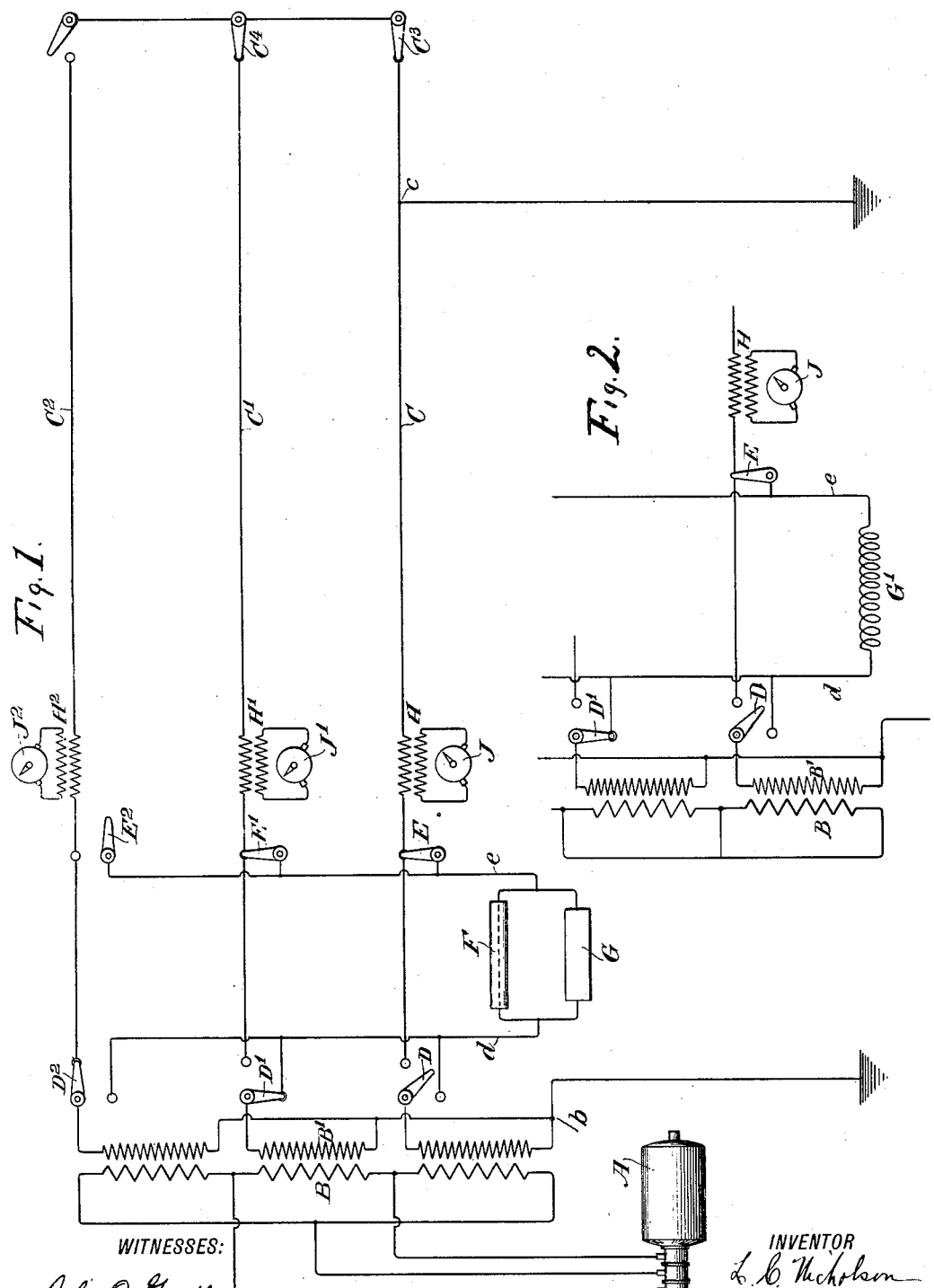

LLOYD C. NICHOLSON, OF BUFFALO, NEW YORK.

FAULT-LOCATING APPARATUS.

No. 880,565.

Specification of Letters Patent.

Patented March 3, 1908.

Application filed March 7, 1907. Serial No. 361,011.

*To all whom it may concern:*

Be it known that I, LLOYD C. NICHOLSON, a citizen of the United States, and a resident of Buffalo, county of Erie, State of New York, have invented certain new and useful Improvements in Fault-Locating Apparatus, of which the following is a specification.

My invention relates to the location of faults on electric circuits, being especially applicable to the location of a fault on an alternating current high tension transmission line. These lines are of great length and frequently develop faults of such a nature, as for example, the development of a defective insulator, as to put the system out of commission until the fault is repaired. It is of the utmost importance that the fault shall be located with reasonable closeness in as short a time as possible and that any test made for the purpose of locating the fault should be conducted with rapidity and without producing destructive effects. At the same time these faults, which usually take the form of the partial grounding of one of the conductors at an insulator, are frequently of such a nature as to require the full normal voltage of the line in order that they may be developed. When such a fault has been developed by this high potential a large current will flow through an arc to ground.

I have employed my invention and will illustrate and describe it in connection with a three phase transmission line in which the secondaries of the stepup transformers used at the generating station are star connected, the neutral point being connected to ground. The invention is, however, applicable to other arrangements and connections with such minor changes as will readily occur to those skilled in the art.

My invention involves the provision of apparatus by which the fault can be rapidly located without a continued flow of a destructive current and without requiring adjustment of the testing apparatus during the continuance of the test.

According to my invention I connect the conductors or some of them of the system in a loop which contains the faulty conductor, and connect this loop to one terminal of a suitable source of power, which in the present instance is indicated as the usual power transformer of the generating station, and I determine the location of the fault by comparing the measurements of two measuring instruments so connected as to indicate by their relative measurements the relative impedances of the two branches of the loop from the source of power to the fault. These two instruments are in the present instance connected respectively to the secondaries of two series transformers whose primaries are placed in the two branches of the loop. By locating the fault in accordance with the indications of these two instruments the fault may be located without the necessity of adjusting any apparatus during the progress of the test, and the results can be arrived at almost instantaneously, thus obviating the necessity of injuring the conductor by a continued arc at the fault.

A further feature of my invention involves the provision of a sufficiently high voltage applied to the fault to insure the development of the same for the purpose of the test, and the provision of means that will reduce or limit the current in the circuit to reduce the destructive effects of the arc and keep the power consumed during the test within the capacity of the generator and within the range of the measuring instruments. I have found that good results may be obtained by providing an impedance in series with the source of power and the loop and shunting this impedance with an inclosed fuse. This enables me to raise the voltage of the circuit to a point at which the arc to ground will develop while the inclosed fuse will be burned by the current flowing after the arc has been developed thus throwing the impedance into circuit and permitting but a relatively small current to pass through the circuit. The same general result may also be attained by employing, as the impedance, an inductance of proper value to offset the condensance of the line, as hereinafter explained, in which a fuse, or its equivalent, need not necessarily be employed.

My invention also comprises more specific features of the combination and arrangement of apparatus, including the specific combination I have employed on a polyphase transmission system.

One specific embodiment of my invention is illustrated diagrammatically in Figure 1 of the accompanying drawings. Fig. 2 indicates a modification.

A indicates a three phase generator which may be considered as representing one or more main generators of a high tension generating station.

B B' indicate, respectively, the primaries and secondaries of stepup transformers through which the high tension current is fed to the transmission line comprising the conductors C, C', C². The particular transformers illustrated have their primaries B' delta connected, while their secondaries B' are star connected, the neutral point $b$ being normally connected to ground, as indicated. It will be understood that these transmission lines may be of very great length, the particular line upon which I have used my invention being over one hundred miles in length. At $c$ I have indicated a fault upon the conductor C by a connection from that conductor to ground. During the normal operation of the system after such a fault develops it will readily be noted at the power house, and the particular conductor in which it is, is known by the indications of the measuring instruments. I have not illustrated and will not describe these nor their connections as these are well known in the art.

D, D', D² represent switches connected to the conductors from the secondaries B' and arranged as indicated to connect said secondaries either with the lines C, C', C², or to connect the secondaries with the conductor $d$, or to open the circuit from its secondary. Switches E, E', E² are arranged to connect or disconnect any of the conductors C, C', C² with the conductor $e$ as indicated. Between the conductors $d$ and $e$ is an inclosed fuse F shunting an impedance G which may be either a non-inductive or an inductive impedance, it not being essential to my invention what character of impedance or impedances are employed. By impedances I mean any apparatus or device that is constructed or arranged to obstruct or limit or reduce the current flowing, and by an inductive impedance or inductance I mean any of the wide variety of apparatus employing an inductive action and used to obstruct or limit or reduce the current flowing.

H, H', H² indicate series transformers whose primaries are connected in conductors C, C', C². The secondaries of these transformers are connected to electrical measuring instruments which give a registration determinative of the currents flowing in the respective conductors C, C', C². These instruments may be indicating, integrating or recording instruments. Except where the fault is of such a character as to cause extremely rapid fluctuations of the currents flowing, indicating instruments are sufficiently satisfactory, although they have the disadvantage of requiring that the two readings, hereafter referred to, must be simultaneously made.

When the station attendant observes that there is a fault such as indicated on the conductor C and desires to locate that fault, he gives telephonic instructions to an attendant at the other end of the transmission line to disconnect the receiving apparatus from the line and connect the faulty conductor with one of the other conductors as by switch C³. The station attendant at the generating end then manipulates such of the switches D, D', D², E, E', E² as may be necessary to connect the faulty conductor C to the conductor which has been connected at the other end, in the present instance, the conductor C', this being effected by connecting conductor C and C' to the conductor $e$ by the switches E, E'. Switch D is opened to disconnect conductor C from the secondary of the power transformers, while switch D' is thrown to connect a secondary of the power transformers with the conductors $d$.

The connection of the various apparatus in this manner causes a circuit to be established from one of the secondaries of the power transformers through the impedances G, G' and fuse F in shunt therewith, then through the conductor $e$ and thence to the fault through parallel branches of the loop formed by the conductors C, C', switch C³ and switches E and E', the circuit from the fault being completed through the ground to the point $b$ of the power transformers.

The fuse F is provided to enable a sufficient voltage to be applied at the fault to enable the arc to develop thereat, even though the fault be only a partial one, otherwise a substantial amount of current will be required in the conductors at the voltage necessary to cause the arc to develop because of the electrostatic capacity of the conductors, which would require an increased voltage at the generating station due to the fact that the impedances G (unless designed to have a suitably proportioned high inductance) will, at the current required by the conductors, absorb a great proportion of the voltage. On the other hand, I have provided the impedances, as will appear, in order to reduce or limit the current after the fault has developed to a safe and desirable value. A sufficiently high voltage, therefore, is applied to the fault to develop an arc. If this is followed by a rush of current of a greater value than that for which the fuse is designed, the fuse will burn out and place the impedance G in series with the loop. This reduces the current to a desirable value and one that can be readily measured by the instruments J, J', the transformer H² and the instrument J² not being in use at the particular test assumed. The currents indicated by the instruments J and J' are inversely proportional to the impedance of the respective branches of the loop to the fault, one branch being outward from the switch E', through the conductor C', through the switches C⁴ and C³ and thence back through the conductor C to the fault, while the other is a shorter path from the switch E, through the conductor C directly to the fault.

From the relative measurements the impedances of the two branches of the loop may be readily calculated since the electrical constants of the circuit are known. I have found in practice that the simplest and most accurate method of determining the exact location is to divide the difference between the readings of the two instruments in the two branches of the loop by the sum of said readings, this always being proportional to the ratio between the impedances of the far end of the faulty conductor to the fault and the impedance of the whole of the faulty conductor. Upon this information it is possible to employ a simple chart which can be used to readily locate the geographical position of any fault upon any transmission line whose electrical constants are known.

I have described the operation of the apparatus with reference to a fault developed in conductor C and the location of that fault by the connection of the conductors C and C' in a loop. It is to be understood that the various apparatus, as shown, is such as to apply the same principle of locating faults to a fault developed in any one of the three conductors, and that either or both of the conductors may be combined with it to form a loop. Occasionally faults may develop between two of the conductors. It is obvious that the apparatus as constituting my invention is equally applicable to locate a fault of this character.

In Fig. 2 I have indicated an inductive impedance G' occupying the same position in the circuit as the impedance G (inductive or noninductive) but not shunted by the fuse and therefore permanently in the testing circuit. If this inductance G' is of such value as to substantially offset the condensance of the transmission line so that a sufficiently high voltage may be applied to the fault while the inductance G' is in circuit to develop that fault then it will not be necessary to employ a fuse or an equivalent for the fuse. This is true because under these conditions despite the presence of the impedance G' the fault will develop while such impedance will limit the flow of current after the fault has developed. It is, of course, well known that an inductance and a condensance in series neutralize each other's effects partially or wholly according to the relative values of the two.

It will be understood that while I have shown numerous details in order to indicate one complete operative system, yet that the various details illustrated are not essential to my invention.

I have illustrated and described several specific features of my invention, but in its broader phase the invention is not limited to the employment of all such features. I have shown a measuring instrument connected so that currents proportional to those flowing in the two branches of the loop may be indicated. It will be understood that the two instruments need not necessarily be connected in the two branches of the loop provided they are so connected as to measure currents from which the relative impedances of the two branches of the loop may be determined. Again it should be understood that it is not essential to my invention what specific portion of the circuit between the generator A and the loop the impedance or impedances are placed, and so far as my invention in its broader phase is concerned, it is immaterial which of the well known means for reducing or limiting currents in a circuit are employed. It is, of course, obvious that my invention is equally applicable whether applied to multiphase circuit, as shown, or to some other kind of system of distribution.

Having thus described my invention, what I claim as new and desire to secure by Letters Patent is,—

1. A means for locating faults comprising a source of electricity, a loop connected to one terminal thereof and containing the faulty conductor, means for applying a high voltage to said fault, means responsive to the flow of current to said fault for limiting said current while maintaining the same impedance ratio of the two branches to the fault, and means acted upon by the currents in said loop for determining the relative impedances of the branches of the loop to the fault.

2. A means for locating faults comprising a source of electricity, a loop connected to one terminal thereof and containing the faulty conductor, means for applying a high voltage to said fault, means responsive to the flow of current to said fault for limiting said current while maintaining the same impedance ratio of the two branches to the fault, and two measuring instruments so connected as to show currents determinative of the relative impedances of the two branches to the fault.

3. A means for locating faults comprising a source of electricity, a loop connected to one terminal thereof and containing the faulty conductor, means for applying a high voltage to said fault, means responsive to the flow of current to said fault for limiting said current while maintaining the same impedance ratio of the two branches to the fault, a transformer in each branch of the loop, and a measuring instrument connected to the secondary of each transformer.

4. A means for locating faults comprising a source of electricity, a loop connected to one terminal thereof and containing the faulty conductor, means for applying a high voltage to said fault, means responsive to the flow of current to said fault for limiting said current while maintaining the same impedance ratio of the two branches to the fault, a transformer in each branch of the loop and means connected to the secondaries of said transformers for determining the relative currents therein.

5. A means for locating faults comprising a source of electricity, a loop connected to one terminal thereof and containing a faulty conductor, an impedance in series with the source and the loop, a current operated circuit opener shunting said impedance, and means acted upon by the currents in said loop for determining the relative impedances of the two branches to the fault.

6. A means for locating faults comprising a source of electricity, a loop connected to one terminal thereof and containing the faulty conductor, an impedance in series with the source and the loop, an inclosed fuse shunting said impedance, and means acted upon by the currents in said loop for determining the relative impedances of the two branches to the fault.

7. A means for locating faults comprising a source of electricity, a loop connected to one terminal thereof and containing the faulty conductor, an impedance in series with the source and the loop, a current operated circuit opener shunting said impedance, and two measuring instruments so connected as to register currents determinative of the relative impedances of the two branches to the fault.

8. A means for locating faults comprising a source of electricity, a loop connected to one terminal thereof and containing the faulty conductor, an impedance in series with the source and the loop, a current operated circuit opener shunting said impedance, a transformer in each branch of the loop, and a measuring instrument connected to the secondary of each transformer.

9. A means for locating faults comprising a source of electricity, a loop connected to one terminal thereof and containing the faulty conductor, an impedance in series with the source and the loop, a current operated circuit opener shunting said impedance, two transformers connected in different conductors of the circuit, and means acted upon by the currents in the secondaries of said transformers for determining the relative impedances of the two branches to the fault.

10. The combination of a polyphase generator, a transmission line, intermediate stepup transformers having star connected secondaries and a grounded connection from the neutral point of the secondaries, means for connecting a grounded conductor in a loop with another conductor, and instruments connected to show currents determinative of the relative impedances of the two branches of the loop to the fault.

11. The combination of a polyphase generator, a transmission line, intermediate stepup transformers having star connected secondaries and a grounded connection from the neutral point of the secondaries, means for connecting a grounded conductor in a loop with another conductor, means for limiting the current in the circuit of the grounded conductor after the ground has been developed, and instruments connected to show currents in the circuit determinative of the relative impedances of the two branches of the loop to the ground.

12. The combination of a polyphase generator, a transmission line, intermediate stepup transformers having star connected secondaries and a grounded connection from the neutral point of the secondaries, means for connecting a grounded conductor in a loop with another conductor, means for limiting the current in the circuit after the ground has been developed, two current transformers located to receive currents determinative of the relative impedances of the two branches of the loop to the ground, and means connected to the secondaries of said transformers for determining said relative impedances.

13. A means for locating faults on alternating current circuits having substantial condensance, comprising a source of electricity, a loop containing the faulty conductor and connected to one terminal of the source, means for completing the circuit from the fault to the other terminal of the source, and inductance in series between the source and the fault, and means acted upon by the currents in said loop for determining the relative impedances of the two branches to the fault.

In testimony whereof, I have signed my name to this specification, in the presence of two subscribing witnesses.

LLOYD C. NICHOLSON.

Witnesses:
 EDWIN SEGER,
 A. DALY.